(12) United States Patent
Seely et al.

(10) Patent No.: US 7,239,810 B2
(45) Date of Patent: Jul. 3, 2007

(54) SYSTEM FOR CONTROLLING AN ELECTRICAL DEVICE

(75) Inventors: Rodrick Seely, Sherwood, OR (US); Andre Perra, Portland, OR (US)

(73) Assignee: Veris Industries, LLC, Portland, OR (US)

( * ) Notice: Subject to any disclaimer, the term of this patent is extended or adjusted under 35 U.S.C. 154(b) by 455 days.

(21) Appl. No.: 09/881,300

(22) Filed: Jun. 13, 2001

(65) Prior Publication Data

US 2002/0193889 A1    Dec. 19, 2002

(51) Int. Cl.
*H04B 10/00*    (2006.01)

(52) U.S. Cl. .................................................. 398/109

(58) Field of Classification Search ........ 398/109–111, 398/106; 250/551
See application file for complete search history.

(56) References Cited

U.S. PATENT DOCUMENTS

| | | | |
|---|---|---|---|
| 3,493,760 A * | 2/1970 | Hoadley | 250/551 |
| 3,696,288 A | 10/1972 | Carman | |
| 4,107,519 A * | 8/1978 | Bicek | 398/109 |
| 4,249,264 A * | 2/1981 | Crochet et al. | 398/141 |
| 4,359,672 A | 11/1982 | Hart | |
| 4,363,061 A | 12/1982 | Vaerewyck et al. | |
| 4,371,814 A | 2/1983 | Hannas | |
| 4,413,193 A | 11/1983 | Crockett | |
| 4,506,199 A | 3/1985 | Asche | |
| 4,605,883 A | 8/1986 | Cockroft | |
| 4,739,229 A | 4/1988 | Heiler, Jr. | |
| 4,746,809 A | 5/1988 | Coleman et al. | |
| 4,956,588 A | 9/1990 | Ming | |
| 4,992,709 A | 2/1991 | Griffin | |
| 5,051,601 A * | 9/1991 | Atobe et al. | 250/551 |
| 5,099,193 A * | 3/1992 | Moseley et al. | 323/324 |
| 5,323,256 A * | 6/1994 | Banks | 398/111 |
| 5,397,970 A | 3/1995 | Rowlette et al. | |
| 5,473,234 A | 12/1995 | Richardson | |
| 5,572,073 A | 11/1996 | Burgess et al. | |
| 5,712,558 A | 1/1998 | Saint-Cyr et al. | |
| 5,909,087 A * | 6/1999 | Bryde et al. | 315/149 |
| 6,020,702 A | 2/2000 | Farr | |
| 6,046,550 A * | 4/2000 | Ference et al. | 315/291 |
| 6,124,791 A | 9/2000 | Wolf | |
| 6,351,206 B1 * | 2/2002 | Schweiger et al. | 340/5.64 |
| 6,380,696 B1 * | 4/2002 | Sembhi et al. | 315/294 |
| 6,384,946 B1 * | 5/2002 | Pitsch et al. | 398/158 |

FOREIGN PATENT DOCUMENTS

JP    5083776    4/1993

* cited by examiner

*Primary Examiner*—Shi K. Li
(74) *Attorney, Agent, or Firm*—Chernoff, Vilhauer, McClung & Stenzel

(57) ABSTRACT

A system for controlling an electrical device that includes an enclosure and an optical signal.

68 Claims, 5 Drawing Sheets

SYSTEM FOR CONTROLLING AN ELECTRICAL DEVICE

BACKGROUND OF THE INVENTION

The present application relates to a system for controlling an electrical device.

Referring to FIG. 1, an electrical system 10 includes a control panel 20 that utilizes a digital computer (or otherwise) to provide effective control of many associated electrical devices. The centralized control panel 20 determines the effects on the entire system 10, or a portion of the system 10, for enabling or disabling an electrical device 24. For example, such associated electrical devices may include motors, pumps, generators, fans, valves, generators, switches, lights, etc. One type of control panel 20 is generally known as a programmable logic controller, such as those sold by Allen Bradley. The control panel 20 typically provides a low voltage, such as 0-24 volts (approximately), to a pilot relay 32. The pilot relay 32 is attached to the exterior of the a contactor housing 26, normally within a pilot relay housing 30, which is typically further located within a motor control center. The pilot relay 32 is electrically interconnected to a contactor 22 which switches on (e.g., starts or otherwise energizes) and off (e.g., stops or otherwise de-energizes) a remotely located associated electrical device 24, such as a motor. The interconnection of the pilot relay 32 to the contactor 22 is typically by a high voltage (or current) connection, such as for example, 120 volts (or approximately). The contactor 22 may alternatively be any type of control device, such as for example, a relay, switch, or starter. The contactor 22 is electrically connected to the electrical device 24 by three power cables 28a, 28b, and 28c for a three-phase electrical device. One, two, or three power cables are used for different types of devices.

The system shown in FIG. 1 is the traditional system for interconnecting a pilot relay to a contactor and has several disadvantages. Initially, an opening is drilled or otherwise opened in the side of the contactor housing 26 and the pilot relay housing 30 is typically threaded onto the contactor housing. The 120 volt wires controlling the contactor 22 are "fished" through the opening in the side of the contactor housing 26 and interconnected to the pilot relay 32 within the pilot relay housing 30, which is difficult and time consuming if the available space is limited. The pilot relay housing 30 is secured, typically with a nut, to the contactor housing 26. The wire(s) from the digital control panel 20 are likewise connected to the pilot relay 32 for controlling the pilot relay 32.

The size of the pilot relay and accordingly the pilot relay housing tends to be rather large because of the relatively large size of the relay necessary to switch 120 volts to the contactor for control. Unfortunately, the relatively large size of the pilot relay housing requires space that may not be readily available, especially in a crowded motor control center. Over an extended time period because of the mechanical nature of a relay, especially in unclean environments, the pilot relay have a tendency to fail or otherwise make unreliable connections. For example, the contacts of the relay may corrode or otherwise the relay may provide surges in current which are unacceptable for reliable operation of the electrical device.

DETAILED DESCRIPTION OF THE PREFERRED EMBODIMENT

The present inventors considered the aforementioned system and considered the national electrical codes which prohibit interconnecting low voltage lines, such as the 24 volt line from the digital control panel 20, into the contactor housing 26 where high voltage lines are present. The electrical voltage and/or current is typically greater within the contactor housing 26 than the corresponding electrical voltage and/or current provided by the digital control panel. With this limitation imposed by the national electrical codes, the present inventors determined that replacing the single device interconnection, namely the pilot relay 32 within the pilot relay housing 30, with a two-part interconnection permits a more effective interconnection to be developed. The initial consideration would consider a two-part interconnection to be less effective and useful than a one-part interconnection, which is counterintuitive, at least in part.

Figure 1:
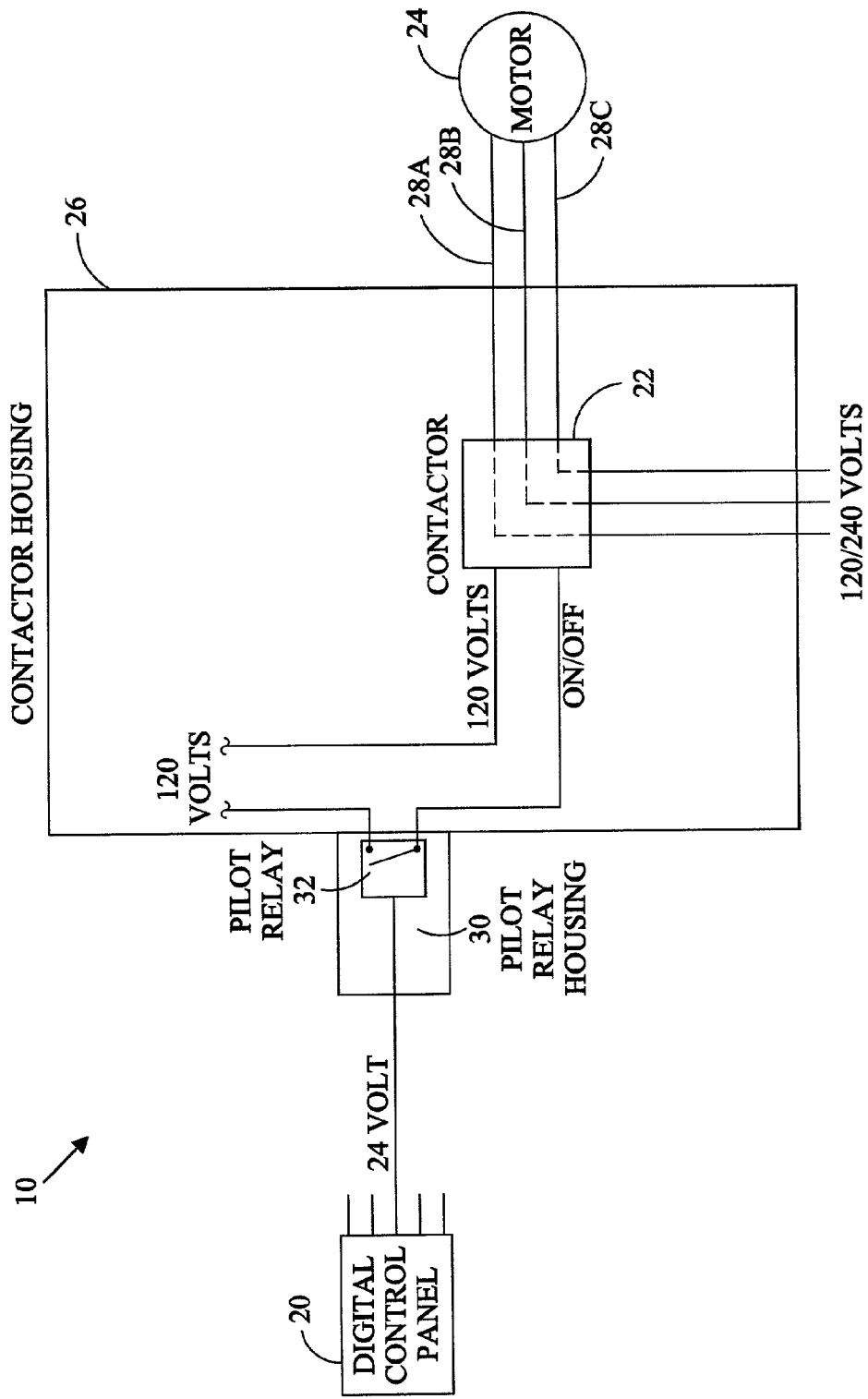
FIG. 1 illustrates a digital control panel, a pilot relay, and a contactor housing with a contactor therein for controlling a motor.
Figure 2:
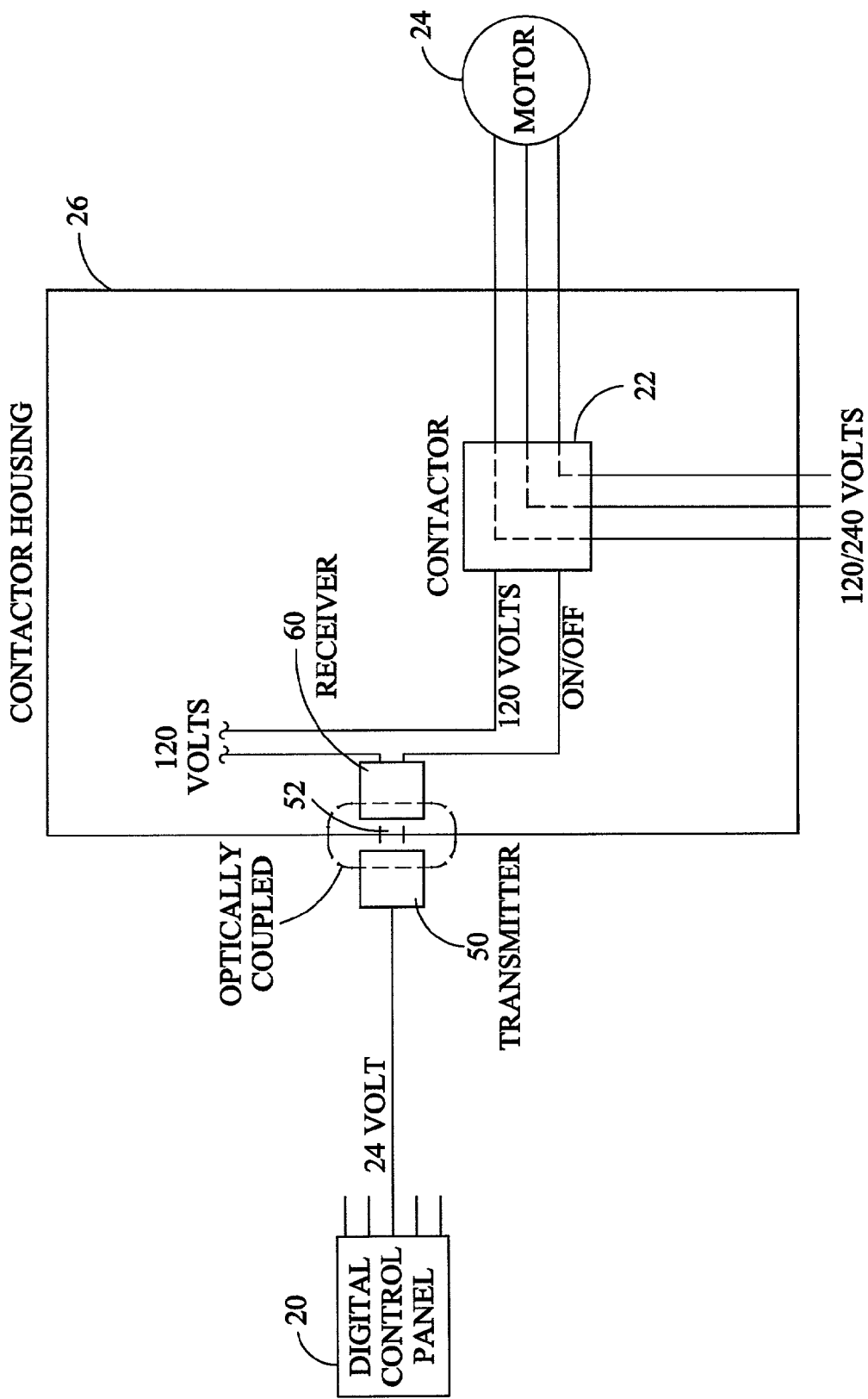
FIG. 2 illustrates a transmitter and receiver combination for a contactor housing.

Referring to FIG. 2, the digital control panel 20 provides a low voltage signal, such as 24 volts, to a transmitter 50. The transmitter 50 is preferably supported by the controller enclosure 26 and is preferably aligned with an opening 52 therein. The transmitter 50 receives the low voltage and/or low current input from the digital control panel 20, and in response thereto, selectively provides an optical signal through the opening 52 of the controller enclosure 26. In this manner, it may be observed that the low voltage electrical signals are free from being routed within the controller enclosure 26 in violation of the national electrical codes, but while permitting a signal to pass into the controller enclosure 26 in response thereto. Moreover, it may be observed that using an optical transmitter, such as a light emitting diode, is free from including a relay or other mechanical switching mechanism. Further, the electronics necessary to convert a low voltage and/or low current signal to an optical signal is minimal so the space required for the transmitter 50 including the housing for the transmitter is negligible. Also, the transmitter 50 may be relatively inexpensive compared to a suitable pilot relay 32. In addition, the power consumption of the optical transmitting device is small and the electrical isolation is greatly increased which increases the safety of the system.

A receiver 60 receives the optical signal from the transmitter 50. The receiver 60 may include any suitable optical receiving device, such as a photo-transistor. The receiver is preferably supported by the controller enclosure 26 and is preferably aligned with the opening 52 therein. The receiver 60 is interconnected to the 120 volt line controlling the contactor 22 by a switching device, such as a solid state alternating current line switch. Accordingly, in response to receiving the optical signal the receiver 60 may selectively activate and de-activate the contactor 22. Similarly, the receiver 60 may be designed in such a manner to be free from a relay or other mechanical switching mechanism. Further, the electronics necessary to receive an optical signal and switch a solid state switch is minimal so the space required for the receiver 60 including the housing for the receiver is negligible. Also, the receiver may be relatively inexpensive compared to a suitable pilot relay 32. In addition, the power consumption of the optical receiving device is small and the electrical isolation is greatly increased which increases the safety of the system.

After further consideration of the interconnection between the transmitter 50 and the receiver 60, they are preferably interconnected in such a manner as to prevent substantially all light sources, other than the transmitter 32, from reaching the receiver. For example, the transmitter 50 and the receiver 60 may be tubular members that are threaded together to form a light tight seal, while simultaneously providing a mechanism for securing the transmitter 50 and the receiver 60 to the controller enclosure 26. While forming a substantially light sealed interconnection is advantageous, preferably the transmitter 50 includes a non-visible optical source (i.e. to the human visual system), such as an infra-red diode, and the receiver includes a corresponding non-visible optical receiver, such as an infra-red receiver. In this manner, the system is more tolerant to inadvertent light sources that may reach the detector of the receiver 60.

Figure 3:
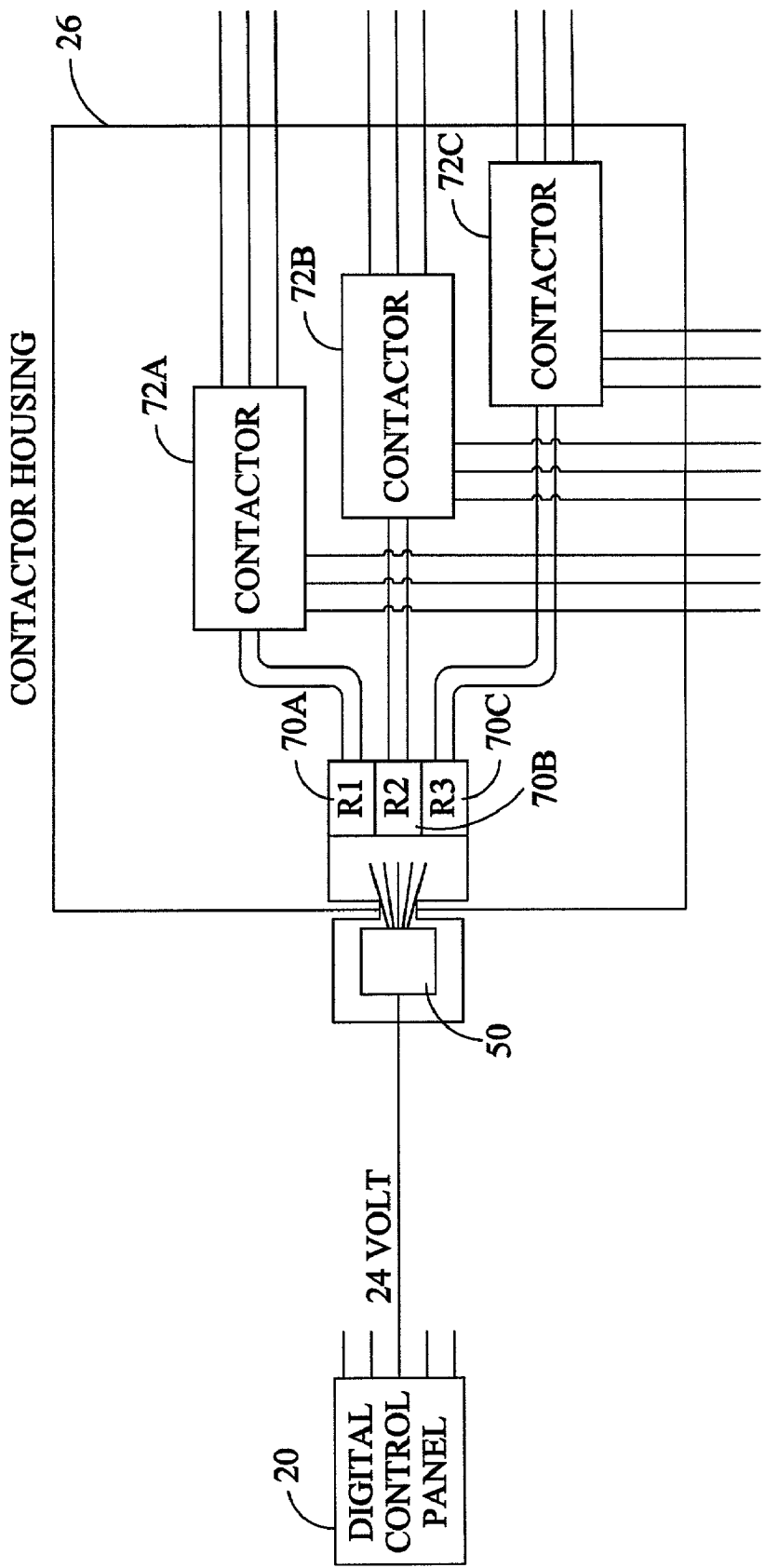
FIG. 3 illustrates a transmitter and multiple receiver combination for a contactor housing.
Figure 4:
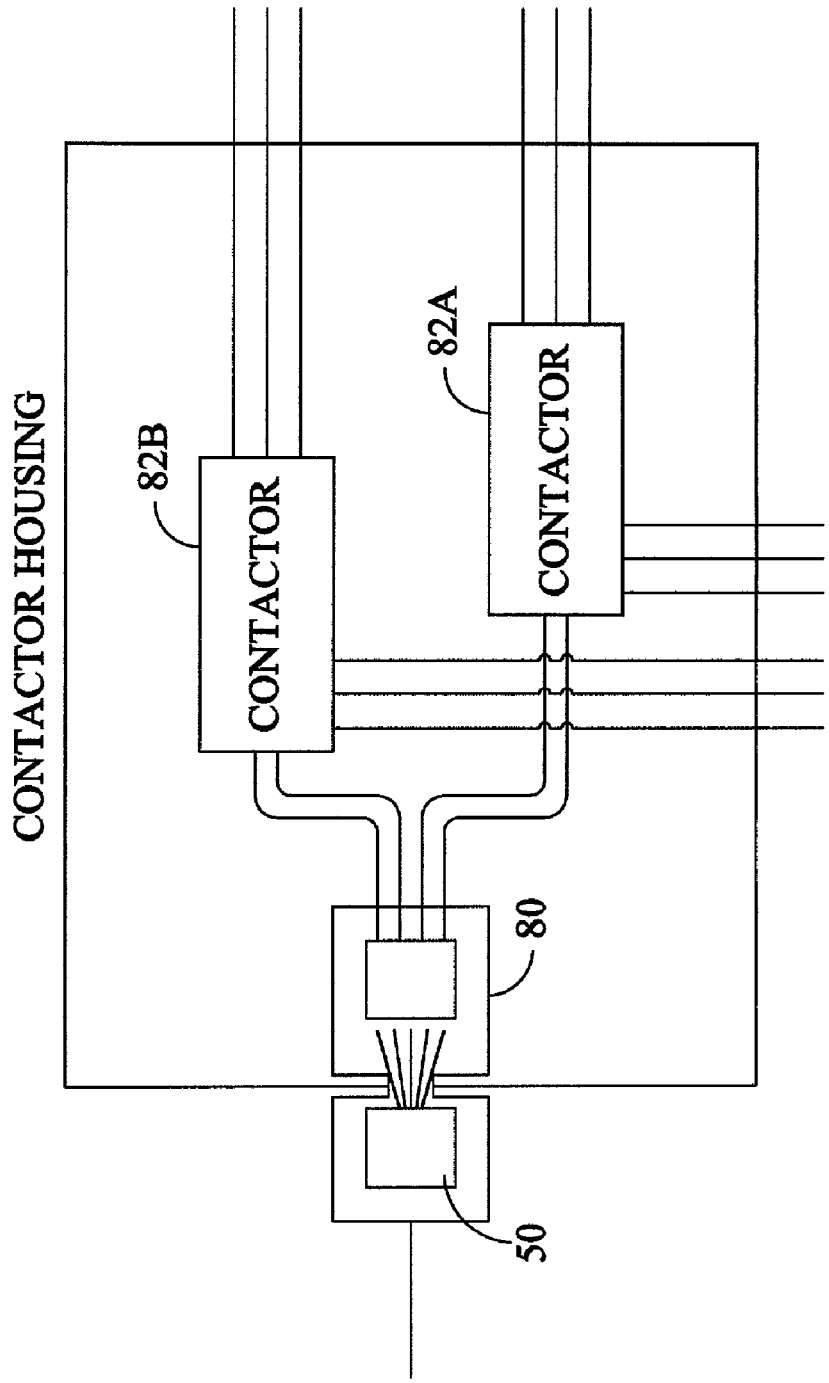
FIG. 4 illustrates a transmitter and receiver combination for multiple contactors within a contactor housing.

In one embodiment the transmitter and the receiver preferably only indicate whether or not the corresponding electrical device is to be energized or de-energized. Referring to FIG. 3, the optical signal may be modulated, a carrier signal, different frequencies, pulsed, or otherwise to provide additional information to one or more receivers. Accordingly, a single transmitter 50 may provide information to multiple receivers 70a, 70b, and 70c with the appropriate receiver switching (e.g., on or off) its respective contactor 72a, 72b, and 72c. Referring to FIG. 4, the optical signal may include information provided to a single receiver 80 that indicates which, of a plurality of contactors 82a, 82b should be energized or de-energized. It may likewise be observed that the transmitter is electrically connected to the controller 20, while the receiver is electrically connected to the contactor(s), and are accordingly separately wired which results in simpler and more efficient installation.

Figure 5:
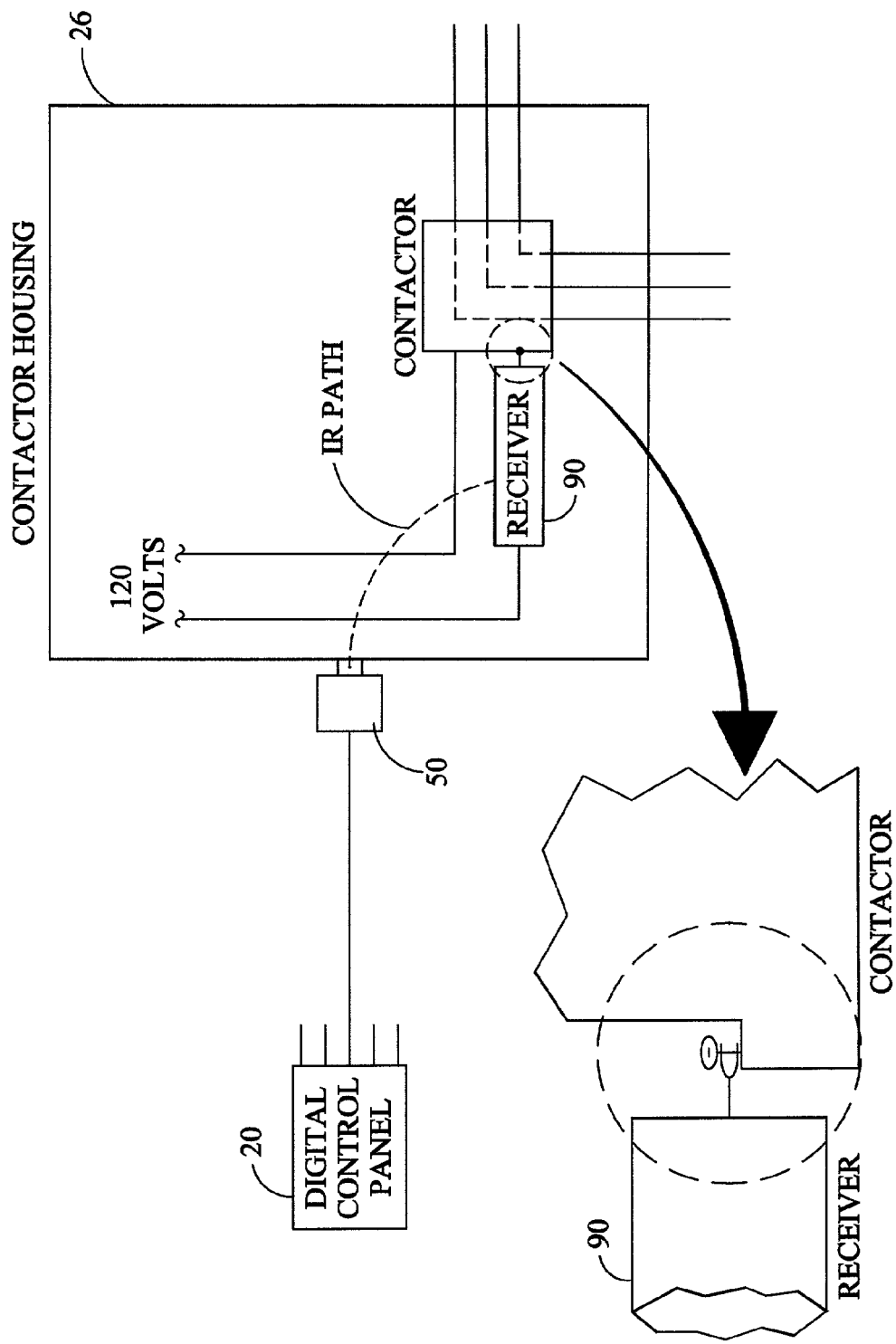
FIG. 5 illustrates a transmitter and spaced apart receiver for a contactor housing.

Referring to FIG. 5, another embodiment includes the receiver 90 being location at a location remote from the transmitter 50. The optical signal then passes through the enclosure 26 to the receiver 90. This permits easier placement of the receiver 90 within the enclosure 26. The receiver 90 preferably includes a metal tab or other electrical interconnection which permits connection of the receiver 90 directly to the contactor. In this manner the interconnection is free from any additional wiring which saves supplies and results in quicker installation.

It is to be understood that additional electrical elements may be provided within the electrical paths, such as for example, protection devices, starters, relays, etc. Also, the optical interconnection between the transmitter and the receiver may be arranged in such a manner that the optical signal only passes through a portion of the wall of the enclosure, such as for example, the optical transmitter and/or receiver being partially within the wall of the enclosure. In addition, the optical interconnection between the transmitter and the receiver may be arranged in such a manner that the optical signal interconnection is provided on the exterior of the enclosure or within the enclosure. In such an exterior interconnection or interior interconnection, preferably the low voltage conductors (e.g., less than approximately 45 volts, and preferably less than approximately 35 volts) are not routed from the exterior to the interior of the enclosure. Preferably, the transmitter and the receiver are proximate and/or supported by the enclosure.

Typically, the receiver includes a neutral conductor, a line conductor (e.g., the 120 volt conductor), and a load conductor (e.g., the conductor to the contactor). The preferred embodiment of the receiver only includes a line conductor and a load conductor, and hence is free from including a neutral conductor.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A system for controlling a remotely located electrical device comprising:
   (a) a transmitter suitable to receive a first signal at a first voltage indicating the desired state of said electrical device and in response thereto provide an optical signal;
   (b) an enclosure including a first device that selectively provides electrical power to said electrical device, wherein said electrical device is exterior to said enclosure, wherein said electrical power is approximately 120 volts or more;
   (c) a receiver suitable to receive said optical signal and in response thereto selectively provide a second signal at a second voltage to said first device to provide said electrical power to said electrical device, wherein said transmitter and said receiver are maintained in a fixed relationship with respect to one another, wherein said transmitter is supported by said enclosure, wherein said transmitter is not located in said enclosure and
   (d) wherein said optical signal passes from outside said enclosure to within said enclosure.

2. The system of claim 1 wherein said transmitter is located outside said enclosure.

3. The system of claim 1 wherein said receiver is located within said enclosure.

4. The system of claim 1 wherein said first signal is less than approximately 24 volts.

5. The system of claim 1 wherein the voltage of said first signal is less than the voltage of said second signal.

6. The system of claim 5 wherein the voltage of said first signal is approximately 24 volts and said second signal is approximately 120 volts.

7. The system of claim 1 wherein said transmitter and said receiver are free from including a mechanical switching mechanism.

8. The system of claim 1 wherein the optical path of said optical signal is free from receiving additional light from a source other than said transmitter.

9. The system of claim 1 wherein said optical signal is infra-red.

10. The system of claim 1 wherein said optical signal is at least one of modulated, includes a carrier signal, has different frequencies, pulsed.

11. The system of claim 1 wherein said optical signal is provided to a plurality of said receivers.

12. The system of claim 11 wherein each of said receivers is associated with a different electrical device to which power is selectively provided.

13. The system of claim 12 wherein each of said receivers determines if said optical signal is intended for its associated electrical device.

14. The system of claim 1 wherein said receiver is electrically connected to said first device in a manner free from a wire between a connector of said receiver and a connector of said first device.

15. The system of claim 1 wherein said receiver includes a line conductor, a load conductor, and is free from including a neutral conductor.

16. The system of claim 1 wherein said transmitter is proximate said enclosure.

17. The system of claim 16 wherein said receiver is proximate said enclosure.

18. A method for controlling a remotely located electrical device comprising:
(a) providing an enclosure including a first device that selectively provides electrical power to said electrical device;
(b) a transmitter receiving a first signal at a first voltage indicating the desired state of said electrical device and in response thereto providing an optical signal, wherein said electrical device is exterior to said enclosure;
(c) a receiver receiving said optical signal and in response thereto provides a signal at a second voltage to cause said first device to selectively provide said electrical power to said electrical device, wherein said electrical power is approximately 120 volts or more, wherein said transmitter and said receiver are maintained in a fixed relationship with respect to one another, wherein said transmitter is supported by said enclosure, wherein said transmitter is not located in said enclosure and said receiver is located in said enclosure; and
(d) wherein said optical signal passes from outside said enclosure to within said enclosure.

19. The method of claim 18 wherein said transmitter is located outside said enclosure.

20. The method of claim 18 wherein said receiver is located within said enclosure.

21. The system of claim 18 wherein said first signal is less than approximately 24 volts.

22. The method of claim 18 wherein the voltage of said first signal is less than the voltage of said second signal.

23. The method of claim 22 wherein the voltage of said first signal is approximately 24 volts and said second signal is approximately 120 volts.

24. The method of claim 22 wherein said transmitter and said receiver are free from including a mechanical switching mechanism.

25. The method of claim 18 wherein the optical path of said optical signal is free from receiving additional light from a source other than said transmitter.

26. The method of claim 18 wherein said optical signal is infra-red.

27. The method of claim 18 wherein said optical signal is at least one of modulated, includes a carrier signal, has different frequencies, pulsed.

28. The method of claim 18 wherein said optical signal is provided to a plurality of said receivers.

29. The method of claim 28 wherein each of said receivers is associated with a different electrical device to which power is selectively provided.

30. The method of claim 29 wherein each of said receivers determines if said optical signal is intended for its associated electrical device.

31. The method of claim 18 wherein said receiver includes a line conductor, a load conductor, and is free from including a neutral conductor.

32. The method of claim 18 wherein said transmitter is proximate said enclosure.

33. The method of claim 32 wherein said receiver is proximate said enclosure.

34. A system for controlling a remotely located electrical device comprising:
(a) a transmitter suitable to receive a first signal having a first voltage indicating the desired state of said electrical device and in response thereto provide an optical signal;
(b) an enclosure including a first device that selectively provides electrical power to said electrical device, wherein said electrical device is exterior to said enclosure;
(c) a receiver suitable to receive said optical signal and in response thereto selectively provide a second signal at a second voltage to said first device to provide said electrical power to said electrical device, wherein said electrical power is approximately 120 volts or more, wherein said transmitter and said receiver are maintained in a fixed relationship with respect to one another, wherein said transmitter is supported by said enclosure, wherein said transmitter is not located in said enclosure and is spaced apart from said receiver by a portion of said enclosure; and
(d) wherein said optical signal passes though at least a portion of the wall of said enclosure.

35. The system of claim 34 wherein said optical signal passes from outside said enclosure to within said enclosure.

36. The system of claim 34 wherein said transmitter is located outside said enclosure.

37. The system of claim 34 wherein said receiver is located within said enclosure.

38. The system of claim 34 wherein said first signal is less than approximately 24 volts.

39. The system of claim 34 wherein the voltage of said first signal is less than the voltage of said second signal.

40. The system of claim 39 wherein the voltage of said first signal is approximately 24 volts and said second signal is approximately 120 volts.

41. The system of claim 34 wherein said transmitter and said receiver are free from including a mechanical switching mechanism.

42. The system of claim 34 wherein the optical path of said optical signal is free from receiving additional light from a source other than said transmitter.

43. The system of claim 34 wherein said optical signal is infra-red.

44. The system of claim 34 wherein said optical signal is at least one of modulated, includes a carrier signal, has different frequencies, pulsed.

45. The system of claim 34 wherein said optical signal is provided to a plurality of said receivers.

46. The system of claim 45 wherein each of said receivers is associated with a different electrical device to which power is selectively provided.

47. The system of claim 46 wherein each of said receivers determines if said optical signal is intended for its associated electrical device.

48. The system of claim 34 wherein said receiver is electrically connected to said first device in a manner free from a wire between a connector of said receiver and a connector of said first device.

49. The system of claim 48 wherein said transmitter is located outside said enclosure.

50. The system of claim 48 wherein said receiver is located within said enclosure.

51. The system of claim 48 wherein said first signal is less than approximately 24 volts.

52. The system of claim 48 wherein the voltage of said first signal is less than the voltage of said second signal.

53. The system of claim 52 wherein the voltage of said first signal is approximately 24 volts and said second signal is approximately 120 volts.

54. The system of claim 48 wherein said transmitter and said receiver are free from including a mechanical switching mechanism.

55. The system of claim 48 wherein the optical path of said optical signal is free from receiving additional light from a source other than said transmitter.

56. The system of claim 48 wherein said optical signal is infra-red.

57. The system of claim 48 wherein said optical signal is at least one of modulated, includes a carrier signal, has different frequencies, pulsed.

58. The system of claim 48 wherein said optical signal is provided to a plurality of said receivers.

59. The system of claim 58 wherein each of said receivers is associated with a different electrical device to which power is selectively provided.

60. The system of claim 59 wherein each of said receivers determines if said optical signal is intended for its associated electrical device.

61. The system of claim 48 wherein said receiver includes a line conductor, a load conductor, and is free from including a neutral conductor.

62. The system of claim 48 wherein said transmitter is proximate said enclosure.

63. The system of claim 62 wherein said receiver is proximate said enclosure.

64. The system of claim 34 wherein said receiver includes a line conductor, a load conductor, and is free from including a neutral conductor.

65. The system of claim 34 wherein said transmitter is proximate said enclosure.

66. The system of claim 65 wherein said receiver is proximate said enclosure.

67. A system for controlling a remotely located electrical device comprising:
   (a) a transmitter suitable to receive a first signal at a first voltage indicating the desired state of said electrical device and in response thereto provide an optical signal;
   (b) an enclosure including a first device that selectively provides electrical power to said electrical device, wherein said electrical device is exterior to said enclosure;
   (c) a receiver suitable to receive said optical signal and in response thereto selectively provide a second signal at a second voltage to said first device to provide said electrical power to said electrical device, wherein said electrical power is approximately 120 volts or more, wherein said transmitter and said receiver are maintained in a fixed relationship with respect to one another, wherein said transmitter is supported by said enclosure, wherein said receiver is located in said enclosure spaced apart from said transmitter by a portion of a wall of said enclosure; and
   (d) wherein said optical signal electrically isolates said transmitter and said receiver.

68. The system of claim 67 wherein said optical signal passes from outside said enclosure to within said enclosure.

* * * * *